US008235023B2

(12) United States Patent
Sergeev

(10) Patent No.: US 8,235,023 B2
(45) Date of Patent: Aug. 7, 2012

(54) INTERNAL COMBUSTION ENGINE

(76) Inventor: Alexandr Nikolaevich Sergeev, Togliatti (RU)

( * ) Notice: Subject to any disclaimer, the term of this patent is extended or adjusted under 35 U.S.C. 154(b) by 51 days.

(21) Appl. No.: 12/908,869

(22) Filed: Oct. 20, 2010

(65) Prior Publication Data

US 2011/0303186 A1    Dec. 15, 2011

Related U.S. Application Data

(63) Continuation of application No. PCT/RU2008/000694, filed on Nov. 7, 2008.

(30) Foreign Application Priority Data

Dec. 29, 2007    (RU) .................................. 2007149349

(51) Int. Cl.
*F02B 19/16*    (2006.01)
*F02B 33/22*    (2006.01)

(52) U.S. Cl. ....................... 123/285; 123/70 R; 123/531

(58) Field of Classification Search .................. 123/58.5, 123/70 R, 72, 259, 264–267, 274, 277, 281, 123/283, 285, 289, 299, 300, 495, 509, 531, 123/533
See application file for complete search history.

(56) References Cited

U.S. PATENT DOCUMENTS 2,058,705 A * 10/1936 Maniscalco ..................... 123/72
3,934,562 A * 1/1976 Isaka ............................. 123/257
5,007,384 A * 4/1991 Blair ............................ 123/48 A (Continued)

FOREIGN PATENT DOCUMENTS

DE    3327948 A1    2/1985

(Continued)

OTHER PUBLICATIONS

International Search Report mailed Jul. 16, 2009 from Corresponding International application No. PCT/RU2008/000694, filed on Nov. 7, 2008.

*Primary Examiner* — Willis Wolfe, Jr.
*Assistant Examiner* — Johnny Hoang
(74) *Attorney, Agent, or Firm* — Houston Eliseeva LLP

(57) ABSTRACT

The invented engine comprises a working cylinder with a piston, pre-ignition chamber with spark plug and a combustion chamber which is cylindrical in shape, a fuel-air mixture injector, which is a compressor cylinder with a piston and fuel delivery device and channels for supplying the fuel and air into the combustion chamber. It also has channels for injection of the fuel-air mixture into the combustion chamber. There is a check valve between the fuel supply channel and the compressor cylinder. The pre-ignition chamber has the shape of a cup or flattened cone. The diameter of the base of the pre-ignition chamber equals the diameter of the combustion chamber. The engine has one or more pairs of channels for delivering the fuel-air mixture to the combustion chamber. The axes of these channels are paired and angled towards each other. The angle between the axes of these channels and the axis of the combustion chamber is selected within the interval between the crossing point of the axes of these channels on the central electrode of the ignition plug and the crossing point of the axis of the combustion chamber with the bottom of the working piston in its top dead point position. The invention provides for improving operation stability of the engine, reducing fuel consumption rate and reducing the toxicity of the exhaust gases by increasing homogeneity of the fuel-air mixture.

5 Claims, 3 Drawing Sheets

U.S. PATENT DOCUMENTS

| | | | | |
|---|---|---|---|---|
| 5,076,229 A | * | 12/1991 | Stanley | 123/289 |
| 5,526,778 A | * | 6/1996 | Springer | 123/42 |
| 5,785,015 A | * | 7/1998 | Philippe et al. | 123/70 R |
| 6,019,075 A | * | 2/2000 | Galka et al. | 123/70 R |
| 6,026,769 A | * | 2/2000 | Anbarasu et al. | 123/70 R |
| 6,189,495 B1 | * | 2/2001 | Tuckey et al. | 123/73 C |
| 6,571,755 B1 | * | 6/2003 | Dunn et al. | 123/70 R |

FOREIGN PATENT DOCUMENTS

| | | | |
|---|---|---|---|
| RU | 2039877 | * | 7/1995 |
| RU | 2230202 | C1 | 6/2004 |
| RU | 2278985 | C2 | 6/2006 |
| SU | 1460372 | A1 | 2/1989 |

* cited by examiner

A-A

C-C  ↓ Air

INTERNAL COMBUSTION ENGINE

RELATED APPLICATIONS

This application is a Continuation of PCT application serial number PCT/RU2008/000694 filed on Nov. 7, 2008 which in turn claims priority to Russian application number RU2007149349 filed Dec. 29, 2007, both of which are incorporated herein for reference in their entirety.

FIELD OF THE INVENTION

The invention relates to motor engineering and can be implemented when manufacturing and operating internal combustion engines with an injection system of fuel-air mixture into the working cylinder of the engine.

BACKGROUND OF THE INVENTION

The internal combustion engine is known (RU Patent No. 2230202C1, dated 8 Jan. 2003, International Patent Classification 7 F02B19/10). This engine comprises a working cylinder provided with a piston, a fuel-air mixture compressor gun and a cylinder head, where a spherical or conical combustion chamber is placed along with a cylindrical pre-ignition chamber. The combustion chamber and the pre-ignition chamber are connected with the mixture compressor gun by one or several channels. Projections of the axes channels parts, included in the combustion chamber and the pre-ignition chamber on the longitudinal section plane of the working cylinder, are placed at angles of 90 . . . 20 and 90 . . . 140° respectively, relative to the working cylinder axis. The channels inputs are arranged tangentially to the chamber surfaces. The combustion chamber channels are directed towards the pre-ignition chamber channels. This configuration makes it possible to increase engine power and to reduce toxicity of exhaust gases by using a poor fuel-air mixture.

However, when the engine operates according to the prototype the fuel-air mixture, passing along the channels from the compressor gun to the pre-ignition chamber and combustion chamber, may cool down, which will lead to the formation of the liquid drop phase in the fuel-air mixture composition, making the mixture leaner in fuel in excess of the permissible limit. In addition to that, part of the fuel-air mixture, sliding along the combustion chamber walls under the influence of the vertical component of centrifugal forces, may untimely (prematurely) be thrown out to the above (over)-piston space, making the mixture that remains in the combustion chamber more lean. As a result the engine operating stability will be impacted, its power will be reduced and fuel consumption rate will increase.

The internal combustion engine protected by the RF Patent No. M>2278985, dated Sep. 24, 2004, International Patent Classification 7 F02B 19/10, 33/22, which is known as well, is taken as a prototype. The engine of the prototype comprises a working cylinder provided with a piston, pre-ignition chamber with spark plug and the combustion chamber. Those are connected with the fuel-air mixture injector which is a compressor cylinder with a piston. The fuel and air inlet channels are located at the top of compressor cylinder above the top dead center and are outfitted with check valves. The channels for supplying fuel-air mixture to the combustion chamber and the pre-ignition chamber are manufactured in the shape of a pipe divided by a partition, or as two parallel tubes; they are located in the chamber with cooling fluid and are outfitted with a heater. A cooling liquid temperature-sensitive element, which is connected with the heater power supply unit, is placed in the zone of these channels. The fuel-air mixture inlet to the pre-ignition chamber has a throttling mechanism with a drive, connected with the tachometer for the engine crankshaft or the fuel supply mechanism. The combustion chamber is cylindrical in shape. The projections of the axes of the fuel-air mixture inlet channels entering the combustion chamber and the pre-ignition chamber onto the plane of the longitudinal section of the working cylinder are perpendicular to the axis thereof. This design ensures improved stability in the engine operation and increased power; it also reduces the fuel usage rate via homogenization of the fuel-air mixture.

However, tests of the prototype engine showed that the jet of the fuel-air mixture after entering the pre-ignition chamber and combustion chamber clings to the chamber walls; by eddying it creates a stagnation pocket in the middle of the said chambers. The pocket is not engaged in the mixing process, thus resulting in a mixture of uneven quality. Rich mixture forms in areas adjacent to the chamber walls, while in the center of the chamber the mixture will be lean. Besides, during compression of the fuel-air mixture in the compressor cylinder pressure may exceed the level for which the fuel inlet device is rated (for example, the nozzle). This may lead to a fuel supply interruption resulting in power reduction and unstable operation of the engine. Utilizing high pressure nozzles and pump will significantly increase the cost of the engine. In the prototype fuel injection takes place after the compressor piston starts its motion from the top dead center towards the bottom dead center. Fuel gasification occurs during piston motion 180° down and 180° up. This time may not be sufficient for full gasification of the fuel; that would also result in negatively impacting operating stability of the engine, increasing inefficient fuel consumption and increasing pollution of the environment.

The technical result of the invention: improvement of operating stability and efficiency of the engine, reduction of fuel consumption and reduction of exhaust gas toxicity by improving the homogenization of the fuel-air mixture.

SUMMARY OF THE INVENTION

The essence of the invention consists in the fact that this internal combustion engine comprises a working cylinder with a piston, pre-ignition chamber with spark plug, and a combustion chamber which is cylindrical in shape, and channels for supplying the fuel-air mixture into the combustion chamber; fuel-air mixture injector, which is a compressor cylinder with a piston and fuel injecting device. Unlike the prototype, there is a check valve between the fuel supply channel and the compressor cylinder. The pre-ignition chamber has the shape of a cup or flattened cone. The diameter of the base of the pre-ignition chamber equals the diameter of the combustion chamber. The engine has one or more pairs of channels for delivering the fuel-air mixture to the combustion chamber. The axes of these channels are paired and angled towards each other. The angle between the axes of these channels and the axis of the combustion chamber is selected within the interval between the crossing point of the axes of these channels on the central electrode of the ignition plug and the crossing point of the axis of the combustion chamber with the bottom of the working cylinder in its top dead point position.

The second option is when the fuel delivery device is installed in the bottom part of the compressor cylinder and connected with the air supply channel. The third option is when the compressor cylinder is equipped with two fuel delivery devices, one of which is located in the bottom part of the compressor cylinder and is connected with the air supply channel, and the other is located in the top zone above the upper dead point of the compressor piston.

Return valves are installed between the fuel delivery channel and the compressor cylinder. The fuel delivery channel is tangentially connected with the air supply channel and is aligned with the direction of the air flow. A throttle plate is installed in the air supply channel. Between the throttle plate and the fuel delivery device a mass air flow sensor is installed connected to the controller, which is linked to the fuel delivery device.

The proposed engine design and the means for control ensure achievement of the technical result, since they eliminate the drawbacks of the prototype. This is ensured by the fact that the change in the pre-ignition chamber shape, angling the channels for fuel-air mixture delivery into the combustion chamber towards each other and suggested limiting of the angle between the axes of these channels and the axis of the combustion chamber, shall ensure more even distribution of the fuel-air mixture within the volume of the pre-ignition chamber and the combustion chamber. The presence of the return valve between the fuel delivery channel and the compressor cylinder will prevent the backflow of the fuel-air mixture through the injection nozzle and eliminate the need to use expensive high pressure equipment. Tangential connection of the fuel delivery channel with the air supply channel in the direction aligned along the air flow will ensure better mixing of fuel with air, thus making the fuel-air mixture more homogeneous. Locating the fuel delivery device in the bottom part of the compressor cylinder will allow for fuel delivery at the beginning of the movement of the compressor piston from the lower dead point towards the upper dead point. This will increase fuel gasification time by 50%. In this case gasification will occur during the time when the engine crankshaft turns by 540°. This will improve the quality of the fuel-air mixture, leading to more complete burning of the fuel in the combustion chamber, reducing the toxicity of the exhaust gases and increasing engine power. Using two fuel delivery devices in the proposed engine, with one device located in the bottom part of the compressor cylinder and connected with the air supply channel, and the second one located in the top part of the compressor cylinder above the upper dead point of the compressor piston, will make it possible to reduce the fuel injection time by half, thus correspondingly increasing the time of fuel gasification, and also will improve conditioning of the fuel-air mixture.

The presence of the throttle plate in the channel for air delivery into the compressor cylinder and air mass flow meter connected with it linked to the controller that controls the fuel delivery device, will make it possible to maintain the set fuel and air ratio in the fuel-air mixture within the compressor cylinder, thus ensuring stable operation of the engine in all modes. Initiating fuel delivery into the air supply channel at the time of the beginning of the movement of the compressor piston from the lower dead point to the upper dead point will increase fuel gasification time by 50%; this will also contribute to forming a more homogeneous fuel-air mixture. As a result, engine operating stability improves and fuel usage rate decreases.

BRIEF DESCRIPTION OF THE DRAWINGS

The invention is illustrated by the following diagrams.

DETAILED DESCRIPTION OF THE PREFERRED EMBODIMENTS

Figure 2:
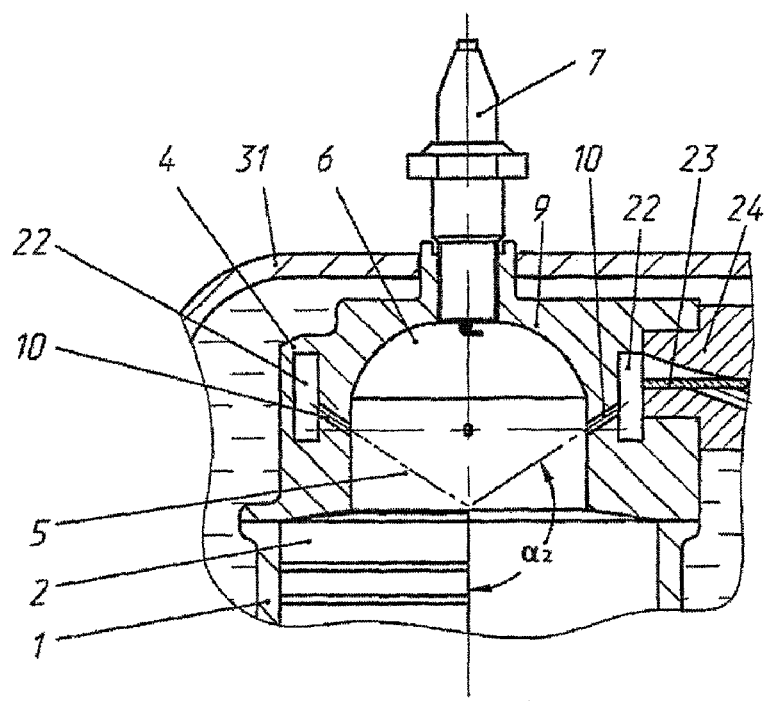
Figure 3:
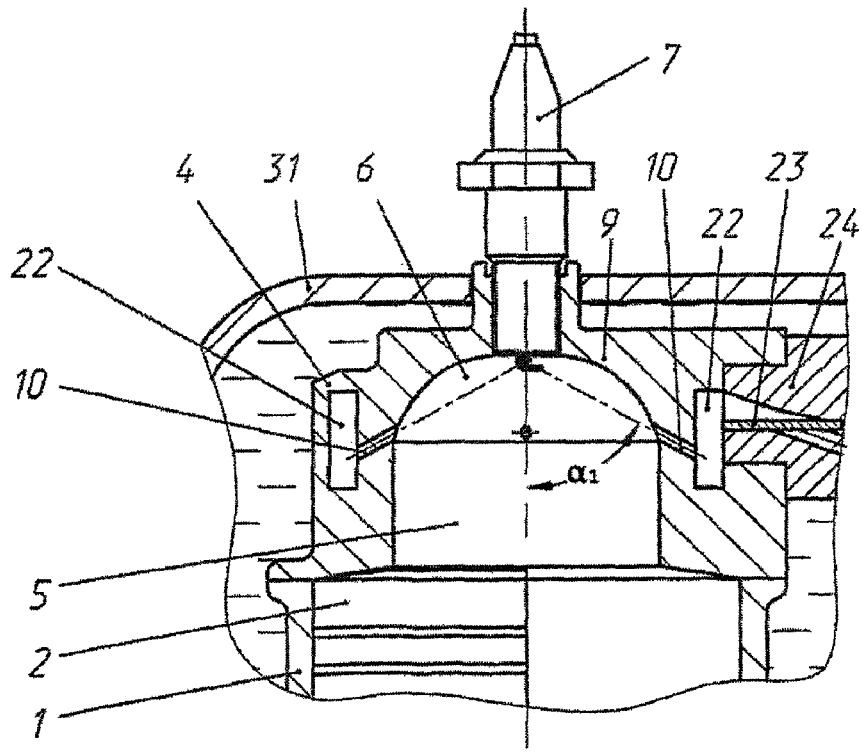
FIG. 3—the section along B-B from FIG. 1 when the axes of the channels delivering the fuel-air mixture into the combustion chamber are angled toward the central electrode of the spark plug.
Figure 4:
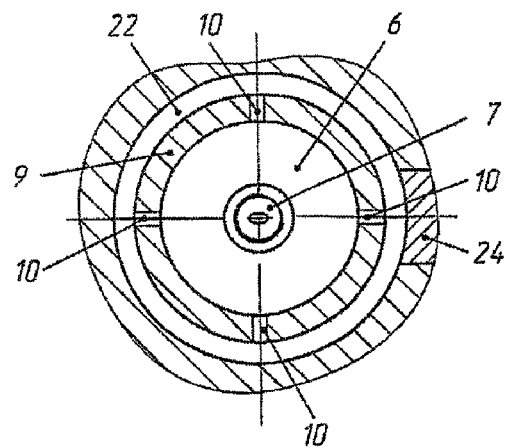
FIG. 4—the section along A-A from FIG. 1.

The proposed internal combustion engine contains a working cylinder 1 with a piston 2, connected to a rod 3. In the working cylinder 1 openings 37 and 38 are provided for air intake and exhaust discharge. In the head 4 of the working cylinder 1, the combustion chamber 5 and pre-ignition chamber 6 with spark plug 7 are located. The combustion chamber 5 is cylindrical in shape and the pre-ignition chamber 6 has a cup-like shape as shown on FIG. 1, or is in the shape of a truncated cone. The diameter of the base of the pre-ignition chamber 6 is equal to the diameter of the combustion chamber 5. The engine is equipped with a fuel-air mixture gun, which is the compressor cylinder 13, which consists of a case 17 and cover 33. The cavity 8 of the compressor cylinder 13 is connected with the combustion chamber via a cutoff valve 21 with spring 20, which is retained by a plate 18, a fuel-air mixture delivery channel 36, which is represented by pipe 26, fitted with a heater 25; return valve 28, mounted in a case 24, with a ring channel 22 and through channels 10, which connect the combustion chamber 5 with the ring channel 22. The heater 25 is connected by wiring 29 with an electrical power supply 30, to which the temperature sensor is connected; it is installed in the engine housing cover 31. Angle α is between the axes of channels 10 and the axis of the combustion chamber 5 selected within the interval between the crossing point of the axes of channels 10 on the central electrode of the spark plug 7 ($\alpha_i$ ref. FIG. 2) and the crossing point of the axis of the combustion chamber 5, with the bottom of the working cylinder in its top dead point position ($\alpha_2$ ref. FIG. 3). The engine comprises one pair or several pairs of channels 10 for injection of the fuel-air mixture into the combustion chamber 5. The axes of channels 10 are paired and angled towards each other (FIG. 4).

Figure 1:
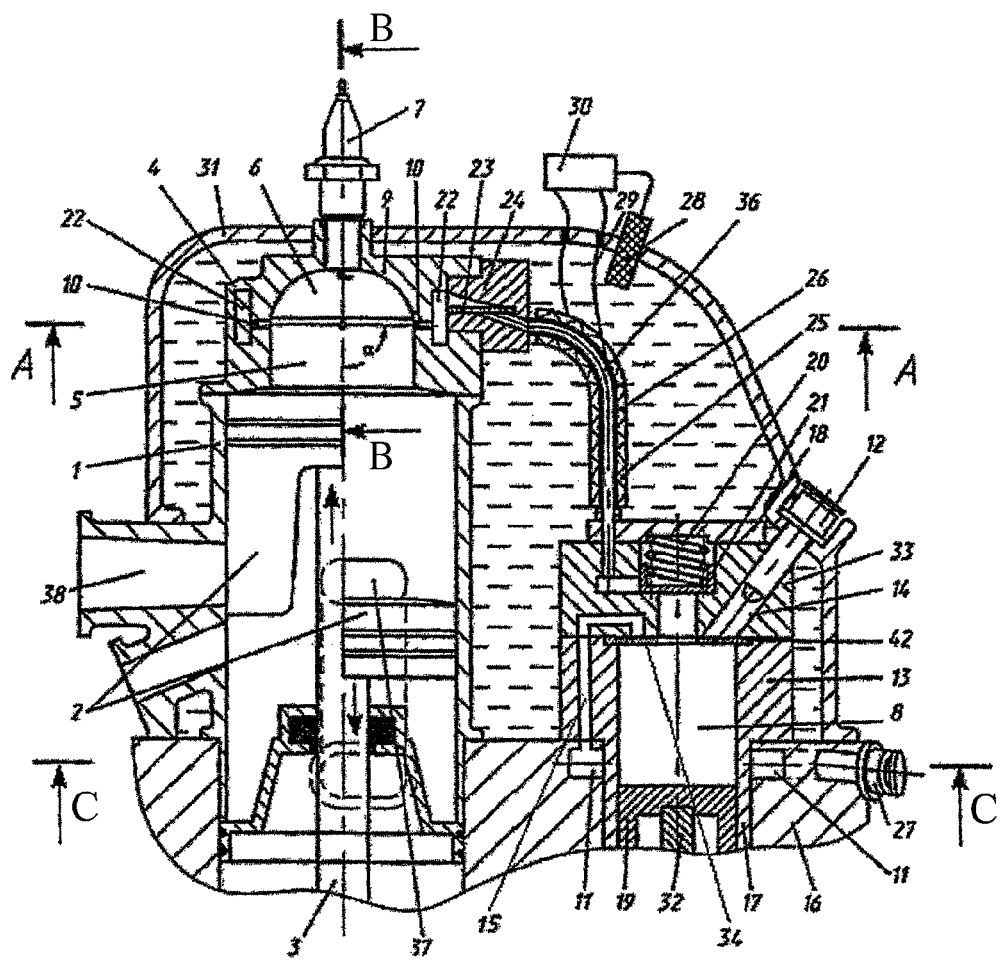
in FIG. 1 the construction diagram of the proposed engine is shown,
in FIG. 2—the section along B-B from FIG. 1, when the axes of the channel for supplying the fuel-air mixture to the combustion chamber are angled toward the crossing point of the axis of the combustion chamber with the bottom of the working cylinder.

The engine is equipped with a fuel delivery device 12, which is installed in the cover 33 of the compressor cylinder 13, in the top part, and connected with the fuel delivery channel 14 (FIG. 1). Between this channel and the cavity 8 of the compressor cylinder 13 a return valve 42 is installed. If the fuel delivery device 27 is located in the bottom part of the compressor cylinder 13, installed in the fuel delivery channel 35, which is tangentially connected with the air supply channel 11 and aligned along the air flow (FIG. 5), then channels 15 for delivery of the fuel-air mixture into cavity 8 of the compressor cylinder 13 are outfitted with return valves 34.

Within the air supply channel 11 a throttle plate 39 is installed. Between that plate and the fuel delivery device 27, an air mass flow meter 40 is installed, connected with controller 41, which is connected with the fuel delivery devices 12 and 27.

The proposed engine operates as follows.
After beginning of movement away from the upper dead point of the compressor piston 19, a rod 32 of which is kinetically connected via a crankshaft with the rod 3 of the working piston 2, fuel is delivered to the cavity 8 of the compressor cylinder 13 via a device 12 and a channel 14.

When the compressor piston 19 moves downward, negative pressure is created above it, valves 34 (FIG. 5) will open due to the pressure differential and clean ambient air will enter the cavity 8 of the compressor cylinder 13 via channels 11 and 15. A fuel-air mixture will form within the cavity, and, as a result of the movement of the compressor piston 19 towards the lower dead point, it will mix actively. After reaching the lower dead point, the compressor piston 19 will start towards the upper dead point, and the compression of the fuel-air mixture will begin. At this stage, pressure within the cavity 8 may exceed the pressure level for which the fuel delivery device 12 is rated. In that case in the prototype engine there will be backflow of the fuel-air mixture through the fuel delivery device 12, resulting in a fuel usage rate increase and diminished engine operation efficiency. Using high pressure nozzles as devices 12 will drastically increase the price of the engine. Therefore the proposed engine design envisages a return valve 42, installed between the channel 14 for fuel delivery and the cavity 8 of the compressor cylinder 13.

Figure 5:
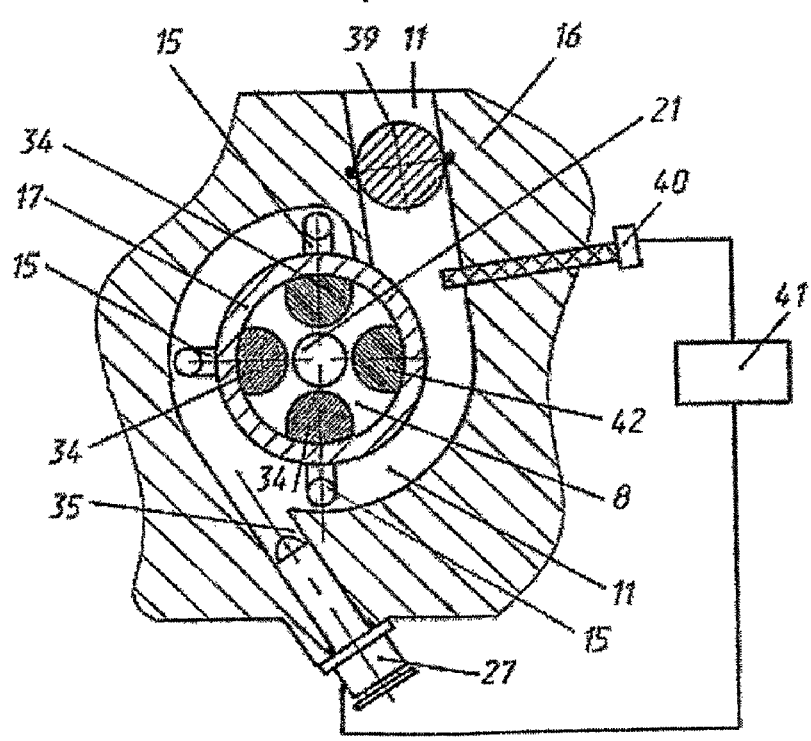
FIG. 5—the section along C-C from FIG. 1.

Another design option envisages locating the fuel delivery device 27 in the bottom part of the compressor cylinder 13. In that case the device 27 is located in the fuel delivery channel 35, which is tangentially connected with the air supply channel 11 and is aligned with air flow in a channel 11 (FIGS. 1 and 5). Through the device 27 and channel 35, fuel injection into the channel 11 is started at the moment of the beginning of the movement of the compressor piston 19 upwards from the lower dead point to the upper dead point, and continues until that movement is complete. During that operation partial fuel gasification occurs and the fuel-air mixture is created. During subsequent movement of the compressor piston 19 from the upper dead point to the lower dead point, the fuel-air mixture from channels 11 through channels 15 is suctioned into the cavity 8 of the compressor cylinder 13 while the crankshaft of the engine, to which rod 32 is kinetically connected, turns by 180°. At the beginning of the next stage of motion of the compressor piston 19 from the lower dead point to the upper dead point valves 34 will reclose. At that time another portion of fuel is injected into the air intake channel 11. The fuel-air mixture within the cavity 8 of the compressor cylinder 13 during the motion of the compressor piston 19 from the lower dead point to the upper dead point will heat due to compression, thus ensuring further fuel gasification. Thus, in the prototype engine and in the proposed engine if the fuel delivery device 12 is located in the top part of the compressor cylinder 13 the fuel-air mixture is gasified while the crankshaft turns 360°, whereas in the proposed option which places the fuel delivery device 27 in the bottom part of the compressor cylinder 13, in the fuel delivery channel 35, tangentially connected with the air intake channel 11, fuel gasification will occur while the engine crankshaft turns by 540°. This will ensure formation of a more homogeneous fuel-air mixture to be injected into the combustion chamber 5 and pre-ignition chambery 6 and, therefore, more complete burning of the fuel; that will reduce fuel consumption, improve engine power and efficiency and reduce the toxicity of the exhaust gases.

Another option of the proposed engine design envisages simultaneous use of two fuel delivery devices 12 and 27. One device 12 is located in the top part of the compressor cylinder 13 in the fuel delivery channel 14, equipped with a return valve 42, and the other device 27 is located in the bottom part of the compressor cylinder 13 in the fuel delivery channel 35, which is tangentially connected with the air supply channel 11 and is aligned along the direction of the air flow. This option allows simultaneous operation of the fuel delivery devices 12 and 27, thus reducing by half the time required to inject the predetermined amount of fuel, and allowing an increase in the fuel gasification time; this will improve the conditioning of the fuel-air mixture and lead to additional reduction of fuel consumption, increase of the engine power and efficiency, and reduce the toxicity of the exhaust gases. The effect will be particularly marked from simultaneous operation of the two fuel delivery devices 12 and 27 in instances when the engine operates at high load, requiring increased power and fuel consumption (when the engine operates using a rich mixture). When ambient air temperature is low and fuel evaporation is slow, only one fuel delivery device 12 will be activated to deliver fuel via its channel 14 and return valve 42 directly into the cavity 8 of the compressor cylinder 13. This ensures a sufficient amount of the fuel-air mixture within the volume of the compressor cylinder 13 and in the combustion chamber 5, which allows a cold start of the engine. After the engine warms up to the required temperature at which fuel in the air delivery channel 11 will gasify, the fuel delivery device 27 will be activated and the engine will continue to operate in the most efficient mode.

When the pressure in the cavity 8 of the compressor cylinder 13 reaches the level for which the spring 20 is calibrated, a cutoff valve 21 will rise and open the inlet to the channel 36. Via a leaf-type return valve 23 the fuel-air mixture is injected into the ring channel 22, from which, via channels 10 (FIGS. 1 and 4) which are paired and located in front of each other, it will be delivered into the combustion chamber 5 and pre-ignition chamber 6. This paired opposing configuration of channels 10 ensures counterflow direction of the fuel-air mixture jets. Near the axis of the combustion chamber 5 counterflows of the fuel-air mixture will collide and evenly distribute throughout the volume of the combustion chamber 5 and pre-ignition chamber 6, thus preventing formation of stagnant pockets in the said volumes or stratification of the fuel-air mixture, which may occur in the prototype engine. Absence of stagnant pockets will result in better fuel combustion increasing the engine power, efficiency and stability of operation; it will also reduce the toxicity of the exhaust gases.

The same technical result can be achieved by proposed limiting of the angle between the axes of channels 10 for delivery of the fuel-air mixture and the axis of the combustion chamber 5. If angle $\alpha$ is greater than angle $\alpha_2$ (FIG. 2) between the axis of the channel 10 which lies on the point of crossing of the axis of the combustion chamber 5 with the bottom of the piston 2 in the upper dead point position, and the axis of the combustion chamber 5, or smaller than angle с ц [sic.] (FIG. 3) formed by the axis of channel 10 when the said axis crosses the point of crossing of the axis of the combustion chamber 5 and the surface of the central electrode of the spark plug 7 and the axis of the combustion chamber 5, the flows of the fuel-air mixture exiting channels 10 will not collide, but will strike the surface of the piston 2 or the surfaces within the pre-ignition chamber 6. In those cases eddying of those flows is possible, which may result in stratification of the fuel-air mixture and ignition failures in the fuel-air mixture. This will result in incomplete burning of the fuel-air mixture increasing inefficient consumption of fuel and the toxicity of the exhaust gases, decreasing the engine power and operating efficiency.

Designing the pre-ignition chamber 6 in the shape of a cup or cone whose base diameter equals the diameter of the cylindrical combustion chamber 5 ensures smooth contours of the surface of the pre-ignition chamber 6 and the combustion chamber 5; this practically rules out the possibility of the formation of stagnation pockets within pre-ignition chamber 6 and the combustion chamber 5. Also, it prevents stratification of the fuel-air mixture and, by promoting more complete burning of the fuel, increases the power of the engine, its efficiency and operation stability, and reduces the toxicity of the exhaust gases.

In the air delivery channel 11 of the proposed engine a throttle plate 39 is installed; between it and the fuel delivery device 27 an air mass flow meter 40 is installed in the channel 11; it is connected with a controller 41, which is connected with fuel delivery devices 12 and 27. Those components contribute to stable operation of the engine in all modes. When it is necessary to adjust the engine power level, the throttle plate 39 may be opened or closed to change the air supply rate via channels 11 and 15 and return valves 34 into the cavity 8 of the compressor cylinder 13. The meter 40 is used to determine the air flow rate change and signal that change from the meter 40 to the controller 41, which determines the amount of fuel that needs to be supplied to the channel 11 or 14, in order to ensure the preset composition of the fuel-air mixture, given the change in the air flow rate. The controller 41 sends commands to devices 12 and 27, signaling the change of the delivered fuel rate. Thus the preset ratio of fuel and air is maintained in the fuel-air mixture, and this ensures stable operation of the engine in all modes.

The proposed engine may be manufactured using known methods and means used in equipment manufacturing: foundry, lathe machining, milling and other types of machining; it can be outfitted with known devices used in engine manufacturing. For example, nozzles can be used as fuel delivery devices 12 and 27, known flow meters can be used as air mass flow meter 40. The test unit, manufactured by the applicant for the purpose of testing, may serve to confirm that the proposed engine can be manufactured.

The proposed engine test unit was tested to compare it with the prototype engine. During the test the engine operated in two-stroke mode using 95 octane gasoline supplied by Bashneft at compression level $\epsilon=14$. In the prototype engine the pre-ignition chamber and the combustion chamber were cylindrical in shape with volumes, respectively, of 5 ml and 36 ml. The proposed engine has a cylindrical combustion chamber 5 whose volume is 34 ml and a pre-ignition chamber 6 in the shape of a cup with a volume of 10 ml.

The testing was performed with warm engines with the crankshaft RPM=1000. During testing, the gas analyzer "Infracar M" was used to determine the composition of exhaust gases. The test results demonstrate (ref. table) that in the exhaust gases of the proposed engine, compared to the prototype, the level of CO decreased by 2.3 times, CH—by 4.13 times, $O_2$—by 1.04 times, and the $CO_2$ level increased by 1.04 times. Excess air ratio in the fuel-air mixture was 2.9 for the proposed engine against 2.3 for the prototype engine.

The data obtained demonstrates that this invention has a technical effect accounted for by more complete burning of the fuel in the proposed engine compared to the prototype. As a result, using the proposed engine will increase its power, improve efficiency and operating stability and will reduce the toxicity of exhaust gases. Therefore, since the proposed engine can be produced with the help of known in engineering means and ensures achievement of the technical effect, the proposed invention has an industrial application.

What is claimed is:

1. An internal combustion engine comprising:
a working cylinder with a working piston, a pre-ignition chamber with a spark plug, the pre-ignition chamber being shaped as a cup or a flattened cone, a diameter of the pre-ignition chamber's base being approximately equal to that of a cylindrically shaped combustion chamber;
a fuel-air mixture injector, which is a compressor cylinder with a piston fuel, a delivery device and channels for supplying the fuel and air into the combustion chamber and channels for injecting of an fuel-air mixture into the combustion chamber;
wherein a check valve is disposed between the fuel supply channel and the compressor cylinder, and wherein the engine has one or more pairs of channels for delivering the fuel-air mixture to the combustion chamber, axes of these channels are paired and angled towards each other at an angle between the axes of these channels and an axis of the combustion chamber, the angle being selected within an interval between a crossing point of the axes of those channels on a central electrode of the spark plug and the crossing point of the axis of the combustion chamber when a bottom of the working piston in its top dead point position.

2. The engine according to claim 1, further comprising a fuel delivery device located in the bottom part of compressor cylinder in the fuel supply channel, the fuel connection channel is tangentially connected with the air supply channel and is aligned along a direction of the air flow.

3. The engine according to claim 1, wherein the compressor cylinder is equipped with two fuel delivery devices one of which is located in the bottom part of the compressor cylinder and connected with the air supply channel, and the other one is located in the top part above the upper dead point of the compressor piston.

4. The engine according to claim 3, further comprising check valves disposed between the air supply channels and compressor cylinder.

5. The engine according to claim 1, further comprising a throttle plate disposed in the air supply channel, and further comprising an air mass flow meter disposed between the throttle plate and the fuel delivery device, the air mass flow meter being coupled to a controller coupled with the fuel delivery device.

* * * * *